Figure 1:
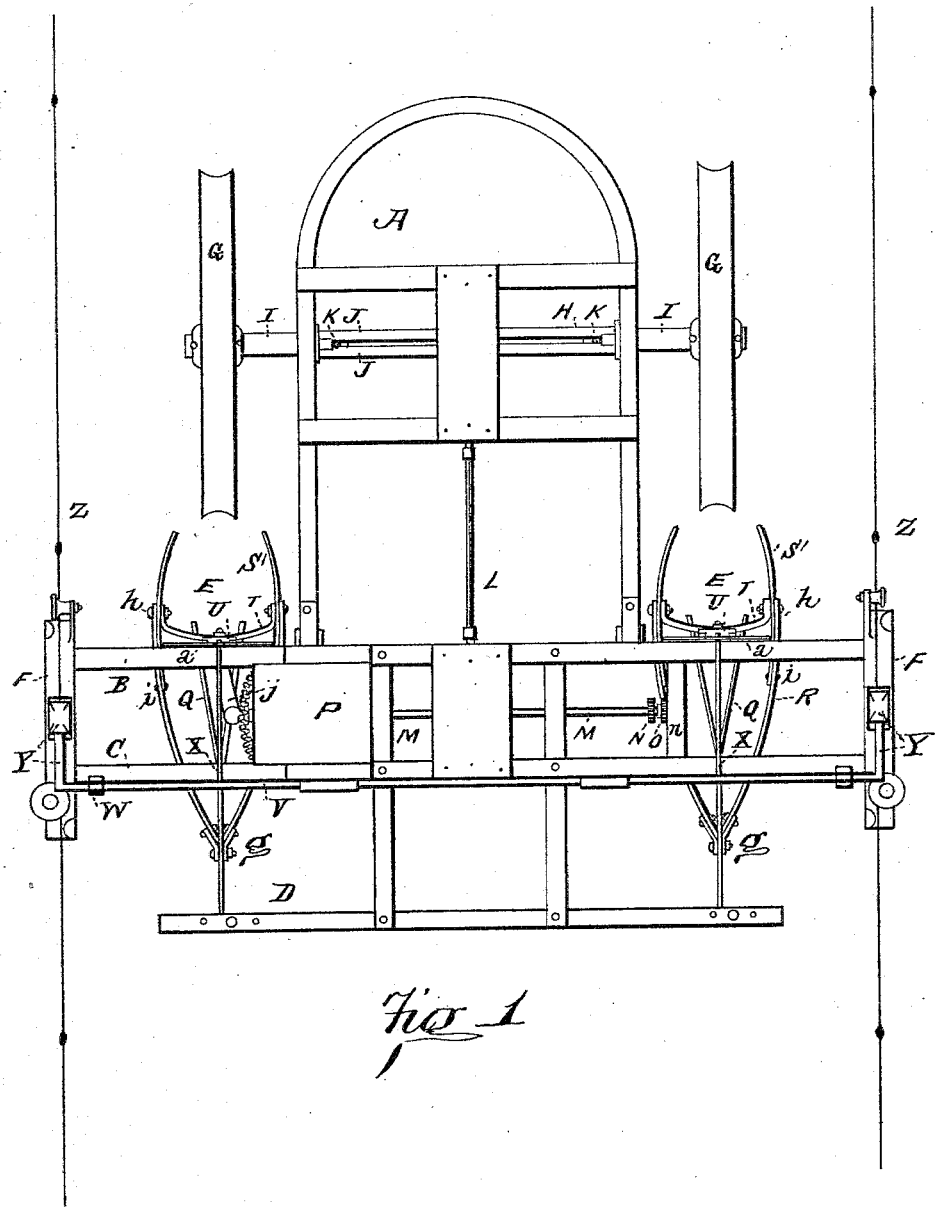

(No Model.) 3 Sheets—Sheet 1.

H. FARMER.
CHECK ROW SEEDER.

No. 274,580. Patented Mar. 27, 1883.

WITNESSES:
John Lorenz
John R. Doods

Henry Farmer  INVENTOR
by James W. See
ATTORNEY

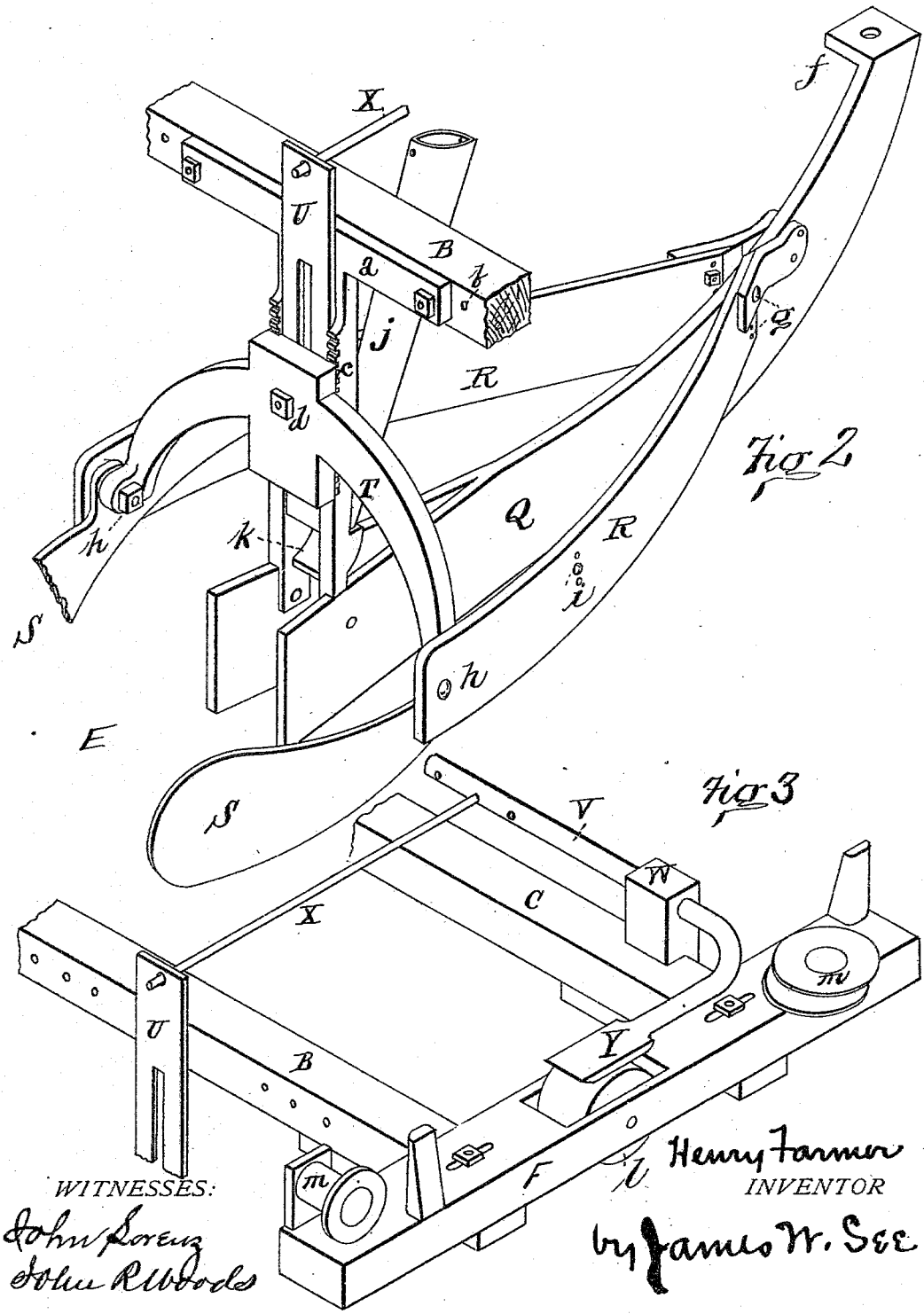

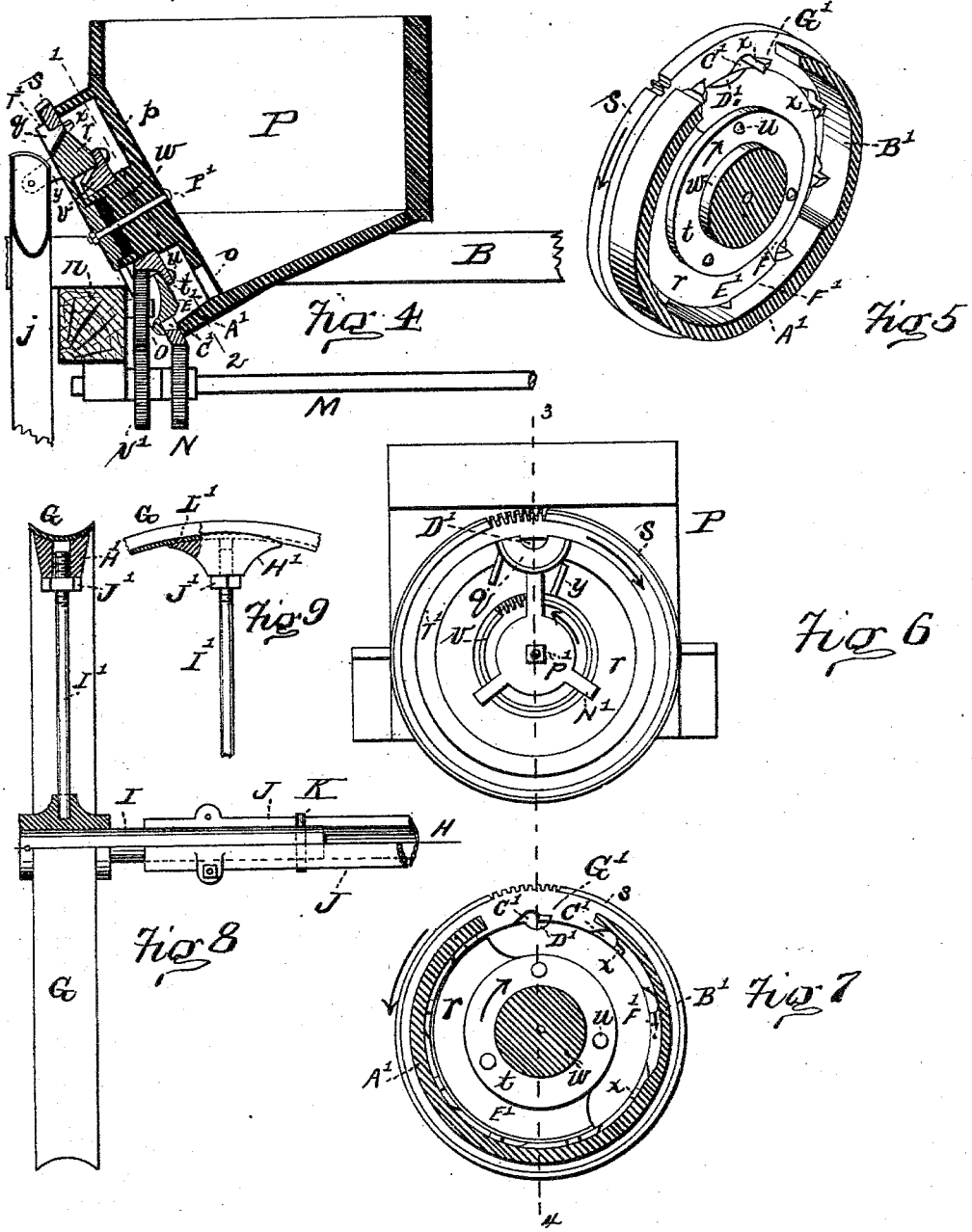

UNITED STATES PATENT OFFICE.

HENRY FARMER, OF RICHMOND, INDIANA, ASSIGNOR OF ONE-HALF TO HENRY P. DEUSCHER, OF HAMILTON, OHIO.

CHECK-ROW SEEDER.

SPECIFICATION forming part of Letters Patent No. 274,580, dated March 27, 1883.

Application filed August 8, 1882. (No model.)

*To all whom it may concern:*

Be it known that I, HENRY FARMER, of Richmond, Wayne county, Indiana, have invented certain new and useful Improvements in Check-Row Seeders, of which the following is a specification.

In the accompanying drawings, Figure 1 is a plan of the machine; Fig. 2, a perspective view of one of the cutters and its attachments; Fig. 3, a perspective view of one of the cord-trips; Fig. 4, a vertical section of one of the seed-boxes on the line 3 4 of Figs. 6 and 7; Fig. 5, a perspective section of one of the seed-boxes on line 1 2 of Fig. 4; Fig. 6, a front elevation of the end of one of the seed-boxes; Fig. 7, a vertical section corresponding with the perspective section, Fig. 5; Fig. 8, a section of a wheel; and Fig. 9, a view of a portion of a wheel, partly in section.

In Fig. 1, A is the usual rear frame, having covering-wheels G and axle H. This frame is articulated, as usual, to the forward frame, B C n D. This forward frame carries two seed-boxes, P, one being removed in Fig. 1. These seed-boxes have rotary feeders, receiving motion from the shafts M, which receive motion from the axle H, as usual. Cutters Q are attached to the forward frame, as usual, and produce the seed-furrow. Pivoted spouts $j$, from the seed-boxes to the drop-hole of the cutters, have their lower ends closed by gates U, so as to retain the seed fed to them by the mechanism of the seed-boxes. Z are the usual check-row cords, having stops, which, during the progress of the machine, at proper times open the gates U and permit the seed to fall to the furrow. The cutters Q produce the seed-furrow, the seed is dropped into the furrow, and the concave wheel G, following in the furrow-line, acts, in its usual manner, as a pressing-coverer. With certain conditions of soil this pressing is undesirable, and I provide means to avoid it. The wheels G are adjustable sidewise, so as to run upon or to one side of the seed-rows, as desired; and I will now set forth the best mode in which I contemplate applying this adjustment, reference being had to Figs. 1 and 8.

The main axle H, carried in the main frame A, as usual, is hollow. The wheels G are attached to stub-axles I, which slide within the hollow axle H. The gage or track of the wheels may thus be altered, so that the wheels may run upon or to one side of the seed-row. After adjustment, the stubs I are fixed by being clamped between the two halves J of the hollow axle H. Other devices for fixing the adjustment may be adopted. The two halves J of the hollow axle H do not join, and in the slot thus formed between them engages a pin, K, in the stub I. This prevents rotation of the stub I in the axle H independent of the clamping action of the two halves J.

The cutters Q are adjustable, as hereinafter set forth, to alter the distance between seed-rows, and the adjustable feature of the wheels G becomes of great utility, aside from the question of their covering or not covering the seed-rows.

The wheels G, Figs. 1, 8, and 9, have the usual thin concave rim, G, and wrought spokes I', cast or otherwise fixed in the central hub. The outer end of each spoke is threaded and provided with nut J' and socket H', which fits against the interior surface of the rim G, being prevented from slipping by dowels L', cast upon the socket and fitting into holes in the rim.

The seed-boxes P are attached to the forward frame of the machine and actuated by the shafts M. The seed-boxes have their faces arranged at an angle, as usual. A rotary seed-wheel working in the face of the box lifts a grain at a time and discharges it into a spout leading to the furrow-cutter.

In Figs. 4, 5, 6, and 7, P is the seed-box; $p$, its face; $o$, the outlet from the box to the feeding or seed wheel; A', a rim projecting from the face $p$; B', a concentric enlargement of the inner diameter of the rim A'; $w$, a boss projecting outward from the face $p$; $r$, a front disk, bolted against the boss $w$; E', a concentric boss, projecting from the front $r$ into the rim A' a slight distance, leaving an annular channel between the inner surface of the rim and the outer surface of this boss E'; F', a cut-away portion of the boss E', whereby the projection of the boss E' into the rim A' is suppressed at this portion of its periphery; $s$, a rim-gear fitted to revolve on the boss E'; $x x$, feeding-ears arranged around the rear surface of the rim-gear s and projecting into the annular space between the periphery of boss E' and the inner surface of rim A'; C' C' notches or buckets cut in the internal bearing-surface of the rim-gear s just in advance of each of the ears x, and of such size as to contain a grain of corn easily; T', a flange upon the front r to retain the rim-gear s in place and at the same time close the front of the buckets C'; D', a notch in the top of the front r, sloping forward into an outlet-nozzle, q, the notch permitting the grain of corn to leave the buckets C' as these buckets pass the notch; j, a spout or conductor pivoted to ears y below the nozzle q; M, a rotary shaft driven by gearing from the main axle of the machine, as usual; N, a pinion on this shaft and engaging with rim-gear s; v, a pinion running on boss w within the chamber formed between the face p and front r, the front being of spider form, as seen in Fig. 6, so as to permit the teeth of the pinion v to be engaged from without the chamber mentioned; t, a flange on the pinion v, fitted to run against the inner face of the boss E'; u, lugs projecting from the rear surface of flange t to act as seed-agitators; v', a second pinion upon the shaft M, and O an idle-pinion gearing into pinions v' and v to drive the latter.

The annular space between the periphery of the boss r and the inner surface of the rim A' is of such dimension as to partially cover the entrance to the buckets C', and to prevent the entrance into the space of any grains of such extraordinary size or shape as to lodge in the buckets and thus choke the feeding. At the enlargement B' of the rim the buckets become entirely uncovered, and at the same time the cut-away portion F' of the boss permits a free access of grain to the buckets. The rim A' has a top gap, G', through which the interior of the feeding device may be inspected. The agitator-disk t and the rim-wheel s run in opposite directions.

Grain from the box P enters the chamber in front of face p through opening o. Undesirable grains cannot enter under boss E' and reach the ears x. Proper grains will enter under the boss and be engaged by the ears x, and during the passage will tend to enter the buckets C'. When grains have thus been selected, so to speak, and carried to the enlargement B' the buckets are freely open, and each is at liberty to receive one of the selected grains and carry it to outlet D', where it drops through spout j to the furrow, as hereinafter explained. The buckets as they reach the enlargement B' take a grain at once, and the main mass of grain is still agitated by the ears x when the mass of grain reaches them, as at the enlargement B'. This operation tends to work the mass upward and overflow the discharge. The agitators u, upon flange t, moving in the opposite direction, tend to keep this mass of grain back and prevent overflow.

The cutters or runners Q have their forward ends bolted to the front rail, D. A series of bolt-holes at the attaching-point permits the distance between the runners to be varied for different widths between seed-rows. The rear of the runners is attached to a casting, a, bolted to the frame-stick B. Holes b permit the casting a to be shifted when the runners are to be adjusted for a different seed-row width. The grain-spout j, pivoted to the seed-boxes, as hereinbefore mentioned, has its lower end terminating in a discharge, k, at the bottom of the casting a, and this lower end of the spout thus readily accommodates itself as the runners are adjusted sidewise.

Guards R have their forward ends pivoted at g to the forward part of the runner, and a series of attaching-holes at that point permits the forward end of the guards to be adjusted vertically with reference to the base of the runner. The rear end of the guards R are pivoted to wings formed on a casting, T, bolted to the casting a by bolt d. These wings form an arch, as shown in Fig. 2, so as to leave a clear space inside the guards. The arch T is adjustable vertically on casting a, and detent-notches c serve as gages, the bolt d working in a slot in the casting a. Either end of the guards R can be thus lowered to alter the depth of cutting front or rear.

The discharge-orifice k, Fig. 2, at the foot of the spout j, is closed by a slide-valve, U, which slides in a channel between the arch T and casting a, being slotted to permit the presence of the bolt d. This slide-valve is operated by the check-row cord, and at proper intervals permits the escape into the furrow of seed received into the spout j from the seed-box.

Covering-blades S' project to the rear of the guards R, as shown in Fig. 2. They are pivoted to the bolt h, which attaches the guards to the arch T, and, projecting forward inside the guards, are bolted at i, where a series of holes in the guards permits the covering-blades to be adjusted pivotally with reference to the guards, so as to regulate the dip of the rear ends of them.

At the ends of the pieces B C, Fig. 1, forming part of the front frame of the machine, cord-receivers F are bolted. They are provided with the usual guide-lugs and guide-wheels to properly retain and guide the check-row cords Z. A rod, V, supported in bearings W, lies parallel with the pieces B and C, and is free to oscillate. At each end of this rod a lever armed with a pad, Y, as shown in Fig. 3, reaches over the cord-receiver F and rests upon or near a roller, l, housed in the cord-receivers, and having its upper peripheral surface projecting somewhat above the surface of the cord-receiver F. The check-row cord lies between the pad Y and roller l, and as each stop on the cord is passed the pad will be lifted and the rod V oscillated.

The slide-valves U are connected to the rod V by levers X, as shown, so that at each oscillation of the pad-lever Y the valves U will open and permit grain to drop to the furrow.

I claim as my invention—

1. The combination, substantially as set forth, of two seed-dropping devices, two wheels, G, following the dropping devices, and an extensible axis for the wheels, adjustable in length independently of the adjustment of the distance between the seeding devices.

2. The combination, substantially as set forth, of the two wheels G, stub-axles I, and hollow axle H, adapted for adjustment in length independent of any adjustment of the supports of the axle.

3. The combination, substantially as set forth, of the two wheels G, stub-axles I, and hollow axle H, formed of the longitudinal halves J.

4. The combination, substantially as set forth, of wheel-tire G, sockets H', doweled to the tires, threaded spokes I', and nuts J'.

5. The combination, substantially as set forth, with the rotary seed-wheel $s$, having buckets C', and ears $x$, of an annular space forming a portion of the path of said ears to prevent access of thick grains to them.

6. The combination, substantially as set forth, of seed-box P, rim A', gear $s$, with ears $x$, and buckets C', and boss E', having cut-away portion F'.

7. The combination, substantially as set forth, of seed-wheel $s$, having ears $x$, and buckets C', and rim A', partially obstructing the entrance to said buckets, and having the relieving-enlargement B'.

8. The combination, substantially as set forth, of seed-box P, seed-gear $s$, arranged to revolve in one direction, and agitator $t\,u$, arranged to revolve in the opposite direction.

9. The combination, substantially as set forth, of seed-box P, front $r$, rim-gear $s$, agitator $t\,u$, pinion $v$, shaft M, gears N and $v'$, and intermediate gear, O.

10. The combination, substantially as set forth, of seed-box P, rim A', boss $w$, front $r$, bolt P', rim-gear $s$, agitator $t\,u$, and gear $v$.

11. The combination, substantially as set forth, of frame B C D, seed-boxes P, fixed on said frame, spouts $j$, pivoted to said seed-boxes, and runners Q, adjustably bolted to said frame.

12. The combination, substantially as set forth, of runners Q, guards R, pivoted at $h$, and bolted adjustably at $g$.

13. The combination, substantially as set forth, of runners Q, guards R, attached to the runners by pivot-bolts $g$ and adjustably attached, at their rear ends, with the runners.

14. The combination, substantially as set forth, of runners Q, casting $a$, guards R, and arch T.

15. The combination, substantially as set forth, of casting $a$, spout $j$, with outlet $k$, arch T, bolt $d$, and slide-valve U.

16. The rim-gear $s$, having buckets C' in its interior periphery, combined with a bearing-boss to fit said gear and form one wall of said buckets, substantially as set forth.

17. The rim-gear $s$, having buckets C' in its interior periphery, and ears $x$, projecting from its back to form prolonged walls to the buckets, and a bearing-boss to fit said gear and form one wall of said buckets, combined substantially as set forth.

18. The combination, substantially as set forth, of runners Q, casting $a$, arch T, guards R, and shovels S', pivoted on arch-bolts $h$, and adjustably bolted at $i$.

19. The combination, substantially as set forth, of cord-receivers F, having rollers $l$, oscillating rod V, having pads Y, and seed-valve lever X.

20. The combination, substantially as set forth, of spout $j$, discharge-orifice K, slide-valve U, lever X, rod V, pad Y, and cord receiver F.

HENRY FARMER.

Witnesses:
 JAMES W. SEE,
 JOHN LORENZ.